Dec. 9, 1969  W. WAGNER  3,482,900
VARIFOCAL OPTICAL OBJECTIVE
Filed July 5, 1966  2 Sheets-Sheet 1

Inventor:
Werner Wagner
BY: Karl G. Ross
Attorney

United States Patent Office 3,482,900
Patented Dec. 9, 1969

3,482,900
VARIFOCAL OPTICAL OBJECTIVE
Werner Wagner, Odernheim am Glan, Germany, assignor to Jos. Schneider & Co., Optische Werke, Bad Kreuznach, Rhineland, Germany, a corporation of Germany
Filed July 5, 1966, Ser. No. 562,604
Claims priority, application Germany, July 8, 1965, Sch 37,345
Int. Cl. G02b 9/60
U.S. Cl. 350—176                                1 Claim

ABSTRACT OF THE DISCLOSURE

Varifocal objective with a substantially fixed front component I and a fixed rear component IV, both positive, bracketing two axially movable negative components II and III, all positioned in front of a basic objective V with four air-spaced lens members. Components I and II consist of a pair of air-spaced lens members each; the first member of the former pair, the second member of the latter pair as well as the second movable component (III) and the second member of the basic objective are doublets.

---

My present invention relates to a varifocal objective system particularly (but not exclusively) intended for still cameras of small size, e.g. for films of 24 x 36 mm.

Such varifocal objectives, e.g. as disclosed in commonly owned U.S. Patent No. 3,057,257 issued to Günter Klemt & Karl Macher, usually consist of a substantially fixed first component of positive refractivity, an axially movable negatively refracting second component, an axially movable negative third component, a fixed positive fourth component, and a multilens fifth component likewise of positive refractivity. The front group comprising the first four components may be designed as a separate varifocal attachment, with the fifth component constituting a basic objective. The term "fixed," as applied particularly to the first component of the front group, does not exclude a limited adjustability for focusing purposes, as is well understood in the art.

The displacement of the two negative components of the front group between two limiting positions establishes minimum and maximum values for the overall focal length of the system, the varifocal range between these limits $f_{min.}$ and $f_{max.}$ being generally centered on a mean overall focal length $f_0$ of a magnitude close to that of the individual focal length of the fixed positive rear group or fifth component, the varifocal front group being thus more or less afocal in its median position of adjustment.

The general object of this invention is to provide an objective system of this type having a varifocal ratio $f_{max.}/f_{min.}$ of 2:1 or better with a relative aperture of substantially 1:2.8 whose optical performance is consistently good over the entire range of adjustment and which affords adequate illumination throughout the image area, including the corners, in all focusing positions ranging from infinity to closeup at, say about $12f_{max.}$ (i.e. 120 cm. in a system having an overall focal length variable between approximately 50 and 100 mm).

A more particular object of my invention is to provide an objective of the character set forth which is a compact construction and, therefore, of a total axial length substantially not exceeding $f_{max.}$, with commensurately small lens diameters.

I have found, in accordance with my invention, that these objectives can be realized by dividing the axially movable second component (i.e. the first negative component of the system) into two members defining between them a biconvex air space with a more strongly curved forward boundary circuit, specifically a meniscus-shaped forward member with a concave rear surface and a rear member with a concave front surface so proportioned that the radius of curvature of the first-mentioned surface has an absolute length less than .4 times that of the radius of curvature of the last-mentioned surface; furthermore, the negative focal length of the forward member should have an absolute value which is less than 80% of that of the individual focal length of this second component, that individual focal length in turn being greater (in absolute terms) than 150% of the maximum axial displacement of the second component between its limiting positions respectively corresponding to $f_{min.}$ and $f_{max.}$. Finally, the absolute value of the individual focal length of the second component should be not only less than that of any other component of the system but also smaller than 80% of the absolute value of the individual focal length of the negative third component immediately following it.

With this construction it is possible to minimize optical aberrations by forming each of the individual lens members of the front group with at least one outer surface having a large radius of curvature. More particularly, with a positive front component constituted by two closely spaced forwardly convex meniscus-shaped lens members, a feature of my invention resides in a substantial flattening of the rear surfaces of these two lens members as well as the front surface of the forward member of the second component, the rear surface of the rear member of the second component, the rear surface of a forwardly concave member constituting the third component and the front surface of a rearwardly convex lens forming the fourth component; the refractive power $\Delta n/r$ of each of these flattened surfaces ($\Delta n$ being the difference in refractive index thereacross) should be less in absolute value than that of the concave front surface of the rear member of the second component.

For good chromatic correction, I prefer to design the first member of the first component, the rear member of the second component and the sole member of the third component as doublets whose cemented surfaces are, respectively, negatively refracting forwardly convex, positively refracting forwardly convex and negatively refracting forwardly concave. For best results, consistent with the substantial flattening of certain outer surfaces as noted above, the cemented surfaces should have relatively small radii of curvature whose absolute values ought to be less than those of the individual focal lengths of the respective components.

The same principle can be applied to the multilens fifth component or basic objective which, in a manner known per se, may be composed of four air-spaced lens members of which the first, second and fourth are positively refracting. For improved chromatic performance I prefer to design the second lens member of this group as a doublet with a forwardly convex cemented surface of negative refractivity again having a radius of curvature which in absolute terms is less than the individual focal length of this four-member component.

In the adjustment of the overall focal length from its minimum value $f_{min.}$ to its maximum value $f_{max.}$, both negative components reach the forward end of their stroke in the $f_{min}$ position and their rearmost location in the $f_{max}$ position. The resulting change in the separation between the two movable components should, according to a further feature of my invention, be a minor portion of the absolute value of the individual focal length of the second component, specifically less than 30% of that individual focal length, in order that residual aberrations be minimized in all relative positions of the second and third components.

The invention will be described in greater detail with reference to the accompanying drawing in which.

Figure 1:
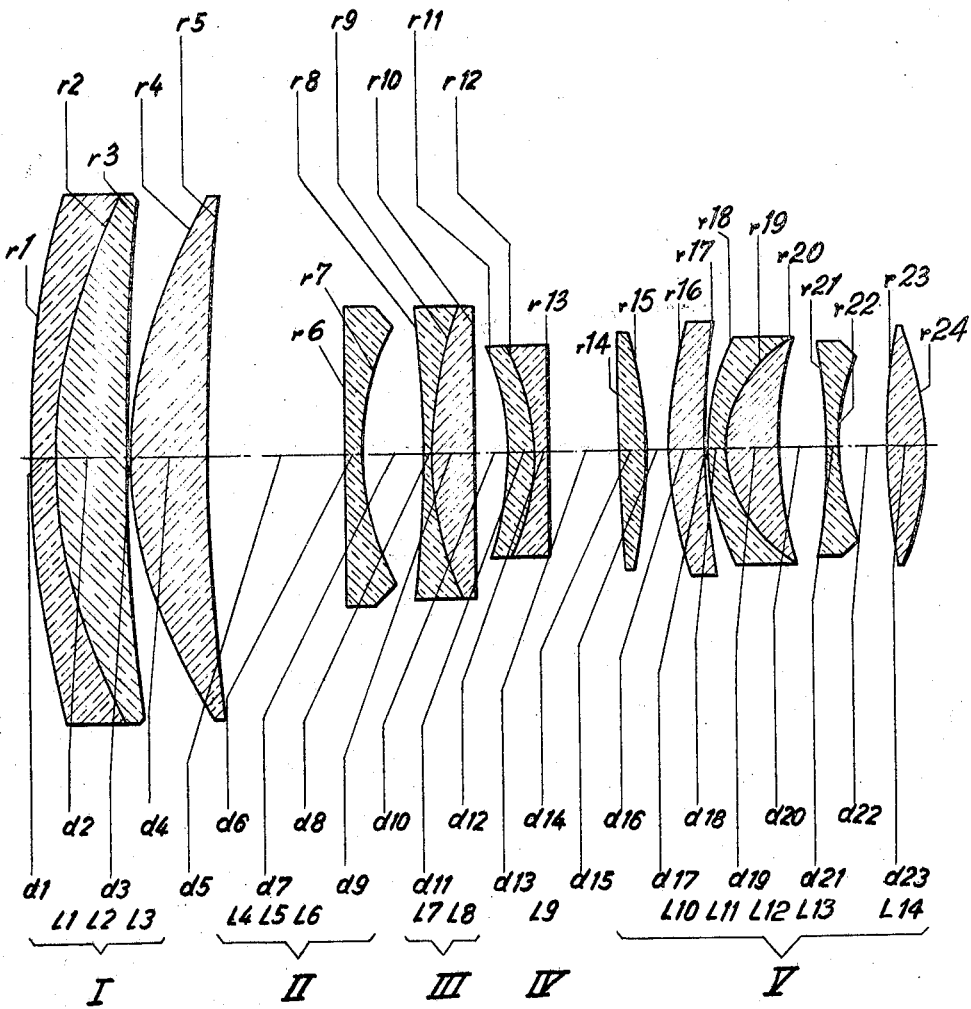
FIG. 1 illustrates an optical objective system embodying the invention.

The system shown in the drawing consists of five distinct components I, II, III, IV and V of which the first four represent a varifocal front group which may or may not be physically detachable from the fifth component V. Component I comprises a first lens member in the form of a doublet L1 (radii $r1$, $r2$ and thickness $d1$), L2 (radii $r2$, $r3$ and thickness $d2$) followed with a small separation $d3$ by a singlet L3 (radii $r4$, $r5$ and thickness $d4$). A variable air space $d5$ intervenes between components I and II, the latter consisting of a singlet L4 (radii $r6$, $r7$ and thickness $d6$) separated by a biconvex air space $d7$ from a doublet L5 (radii $r8$, $r9$ and thickness $d8$), L6 (radii $r9$, $r10$ and thickness $d9$). Component III, following after another variable air space $d10$, is a doublet constituted by lenses L7 (radii $r11$, $r12$ and thickness $d11$), L8 (radii $r12$, $r13$ and thickness $d12$); a third variable air space $d13$ precedes the fixed component IV in the form of a singlet L9 with radii $r14$, $r15$ and thickness $d14$. A fixed air space $d15$, which could accommodate a diaphragm (not shown), separates group I–IV from component V constituted of a positive singlet L10 (radii $r16$, $r17$ and thickness $d16$), a positive doublet L12 (radii $r18$, $r19$ and thickness $d18$), L13 (radii $r19$, $r20$ and thickness $d19$), a negative singlet L14 (radii $r21$ and $r22$ and thickness $d21$) and a positive singlet L15 (radii $r23$, $r24$ and thickness $d23$), these four lens members being separated by air spaced $d17$, $d20$ and $d22$.

The following table lists representative values for the radii $r1$ to $r24$ and the thicknesses and separations $d1$ to $d23$ of lenses L1 to L15 (based upon a numerical value of 72 for a mean overall focal length $f_0$), the refractive indice $n_d$ of these lenses, their Abbè numbers $v$ and their surface powers $\Delta n/r$, the system so defined having an aperture ratio of 1:2.8 and a backfocal length of 48.2 linear units (e.g. millimeters).

TABLE I

| | Lens | Radii | Thicknesses and Separations | $n_d$ | $v$ | $\Delta n/r$ |
|---|---|---|---|---|---|---|
| I | L1 | $r1 = +110.56$ | $d1 = 2.30$ | 1.80518 | 25.46 | +0.007283 |
| | | $r2 = +60.31$ | | | | −0.004193 |
| | L2 | $r3 = +268.8$ | $d2 = 7.50$ | 1.55232 | 63.49 | −0.002055 |
| | | | $d3 = 0.10$ | Air space | | |
| | L | $r4 = +46.49$ | $d4 = 8.75$ | 1.62041 | 60.29 | +0.013345 |
| | | $r5 = +219.4$ | | | | −0.002828 |
| | | | $d5 = 14.54$ | Air space (variable) | | |
| II | L4 | $r6 = +420.0$ | $d6 = 1.50$ | 1.62230 | 53.14 | +0.001482 |
| | | $r7 = +28.09$ | | | | −0.022154 |
| | | | $d7 = 6.80$ | Air space | | |
| | L5 | $r8 = −181.20$ | $d8 = 1.00$ | 1.71300 | 53.89 | −0.003935 |
| | | $r9 = +41.81$ | | | | +0.000366 |
| | L6 | $r10 = −230.6$ | $d9 = 5.00$ | 1.72830 | 28.66 | +0.003158 |
| | | | $d10 = 3.02$ | Air space (variable) | | |
| III | L7 | $r11 = −56.12$ | $d11 = 3.00$ | 1.60565 | 37.95 | −0.010792 |
| | | $r12 = −26.99$ | | | | −0.003977 |
| | L8 | $r13 = −428.0$ | $d12 = 1.00$ | 1.71300 | 53.89 | +0.001666 |
| | | | $d13 = 7.98$ | Air space (variable) | | |
| IV | L9 | $r14 = +339.4$ | $d14 = 3.00$ | 1.65844 | 50.84 | +0.001940 |
| | | $r15 = −52.00$ | | | | +0.012662 |
| | | | $d15 = 2.5$ | Air space | | |
| V | L10 | $r16 = +48.73$ | $d16 = 3.90$ | 1.62041 | 60.29 | +0.012732 |
| | | $r17 = +946.6$ | | | | −0.000655 |
| | | | $d17 = 0.10$ | Air space | | |
| | L11 | $r18 = +26.90$ | $d18 = 1.50$ | 1.62364 | 36.75 | +0.023184 |
| | | $r19 = +12.15$ | | | | −0.000266 |
| | L12 | $r20 = +38.21$ | $d19 = 5.00$ | 1.62041 | 60.29 | −0.016237 |
| | | | $d20 = 5.00$ | Air space | | |
| | L13 | $r21 = −109.66$ | $d21 = 1.55$ | 1.64831 | 33.77 | −0.005912 |
| | | $r22 = +25.45$ | | | | −0.025474 |
| | | | $d22 = 7.95$ | Air space | | |
| | L14 | $r23 = +84.79$ | $d23 = 3.50$ | 1.57957 | 53.86 | +0.006835 |
| | | $r24 = −35.89$ | | | | −0.016149 |
| | | | $d_{total} = 96.49$ | | | |

The individual focal lengths of the components I, II, III, IV and V of the foregoing system have the following numerical values:

$f_I = +86.10$ $f_{II} = −48.0$ $f_{III} = −75.92$ $f_{IV} = +68.37$ $f_V = −67.19$

For specific values of the overall focal length $f$, including the mean focal length $f_0$, the variable air spaces $d5$, $d10$ and $d13$ have the following widths:

| $f$ | $d5$ | $d10$ | $d13$ |
|---|---|---|---|
| 48.0 | 0.638 | 10.885 | 14.028 |
| 72.0 | 14.544 | 3.024 | 7.982 |
| 85.0 | 19.240 | 2.300 | 4.010 |
| 96.0 | 22.288 | 2.744 | 0.518 |

The numerical values of the foregoing table are to be understood as valid within tolerance limits of substantially ±10% for the thicknesses and separations $d1$–$d23$, the surface powers $\Delta n/r$ and the Abbé numbers $\nu$ and of substantially 0.02 for the refractive indices $n_d$ (given for a reference wavelength of 587.6 microns).

It will be noted that individual focal length $f_{II}$ satisfies the aforestated requirement of being, in absolute terms, less than 80% of $f_{III}$ (i.e. 60.74 units) and smaller than $f_I$, $f_{IV}$ and $f_V$; also, the ratio of the radii defining the biconvex air space $d7$ is $r7/r8=0.155<0.4$. The refractive powers of surfaces $r3$, $r5$, $r6$, $r10$ and $r13$ are all smaller in absolute value than that of surface $r8$.

Moreover, the radii of the cemented surfaces $r2$, $r9$, $r12$ and $r19$ are, again in absolute values, shorter than the corresponding individual focal lengths $f_I$, $f_{II}$, $f_{III}$ and and $f_V$. Finally, the maximum change of variable air space $d10$ is less than 30% of $f_{II}$ (i.e. 14.4 units).

Attention is called to the fact that the spacing $d5$ between components I and II is near zero in the position of minimum focal length and that, conversely, the air spaces $d10$ and $d13$ between components II, III and IV are quite small in the position of maximum focal length.

Figure 2:
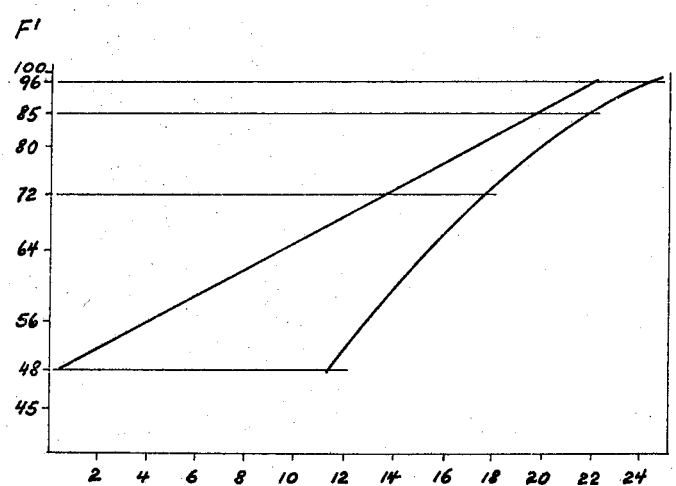
FIG. 2 is a diagram giving the law of motion of the movable components.

The two graphs of FIG. 2 respectively represent, as a function of overall focal length $f$, the air space $d5$ and the sum of air spaces $d5$, $d10$, Inasmuch as the sum of air spaces $d5$, $d10$ and $d13$ must remain constant, space $d13$ can be readily determined.

Component I or one of its members may be axially shiftable for focusing purposes.

I claim:
1. An optical objective comprising a substantially fixed positive first component consisting of a first lens member L1, L2, an axially movable negative second component consisting of a third lens member L4 and a fourth lens member L5, L6, an axially movable negative third component consisting of a fifth lens member L7, L8, and axially fixed positive fourth component consisting of a fixed lens member L9, and a fixed positive fifth component consisting of a sixth lens member L10, a seventh lens member L11, L12, an eighth lens member L13 and a ninth lens member L14; said second and third components being displaceable between a first limiting position of minimum overall focal length and a second limiting position of maximum overall focal length, said third component reaching the forward end of its stroke in said first position and the rear end of its stroke in said second position, said second component being close to said first component in said first position and close to said third and fourth components in said second position, the change in separation between said second and third components in passing from said first to said second position being less than 30% of the absolute value of the individual focal length of said second component; said lenses L1 to L14 having radii $r1$ to $r24$ and thickness and separations $d1$ to $d23$ whose numerical values, based upon a numerical value of 72 for a mean overall focal length, along with the refractive indices $n_d$ and the Abbé numbers $\nu$ thereof are substantially as given in the following table:

TABLE

| Lens | Radii | Thicknesses and Separations | $n_d$ | $\nu$ |
|---|---|---|---|---|
| L1 | $r1 = +110.56$ | $d1 = 2.30$ | 1.805.7 | 25.46 |
|    | $r2 = +60.31$  | $d2 = 7.50$ | 1.55232 | 63.49 |
| L2 | $r3 = +268.8$  | $d3 = 0.10$ | Air space | |
| L3 | $r4 = +46.49$  | $d4 = 8.75$ | 1.62041 | 60.29 |
|    | $r5 = +219.4$  | $d5 = 14.54$ | Air space (variable) | |
| L4 | $r6 = +420.0$  | $d6 = 1.50$ | 1.62230 | 53.14 |
|    | $r7 = +28.09$  | $d7 = 6.80$ | Air space | |
| L5 | $r8 = -181.20$ | $d8 = 1.00$ | 1.71300 | 53.89 |
|    | $r9 = +41.81$  | $d9 = 5.00$ | 1.72830 | 28.66 |
| L6 | $r10 = -230.6$ | $d10 = 3.02$ | Air space (variable) | |
| L7 | $r11 = -56.12$ | $d11 = 3.00$ | 1.60565 | 37.95 |
|    | $r12 = -26.99$ | $d12 = 1.00$ | 1.71300 | 53.89 |
| L8 | $r13 = -428.0$ | $d13 = 7.98$ | Air space (variable) | |
| L9 | $r14 = +339.4$ | $d14 = 3.00$ | 1.65844 | 50.84 |
|    | $r15 = -52.00$ | $d15 = 2.5$ | Air space | |
| L10 | $r16 = +48.73$ | $d16 = 3.90$ | 1.62041 | 60.29 |
|     | $r17 = +946.6$ | $d17 = 0.10$ | Air space | |
| L11 | $r18 = +26.90$ | $d18 = 1.50$ | 1.62364 | 36.75 |
|     | $r19 = +12.15$ | $d19 = 5.00$ | 1.62041 | 60.29 |
| L12 | $r20 = +38.21$ | $d20 = 5.00$ | Air space | |
| L13 | $r21 = -109.66$ | $d21 = 1.55$ | 1.64831 | 33.77 |
|     | $r22 = +25.45$ | $d22 = 7.95$ | Air space | |
| L14 | $r23 = +84.79$ | $d23 = 3.50$ | 1.57957 | 53.86 |
|     | $r24 = -35.89$ | | | |

References Cited

UNITED STATES PATENTS 3,059,536  10/1962  Cox et al. _____ 350—186
3,350,155  10/1967  Macher _____ 350—184
3,366,432  1/1968   Moriyama et al. _____ 350—186

FOREIGN PATENTS 1,242,012  9/1964  Germany.

DAVID SCHONBERG, Primary Examiner

PAUL R. GILLIAM, Assistant Examiner

U.S. Cl. X.R.

350—184, 214